Jan. 5, 1965    R. B. WILLIAMSON ETAL    3,164,224
CAR RETARDER FOR RAILROADS
Original Filed Dec. 7, 1959    3 Sheets-Sheet 1

*INVENTORS*
R.B. WILLIAMSON AND
I.A. DE KRAMER
BY
*Forest B. Hitlock*
THEIR ATTORNEY

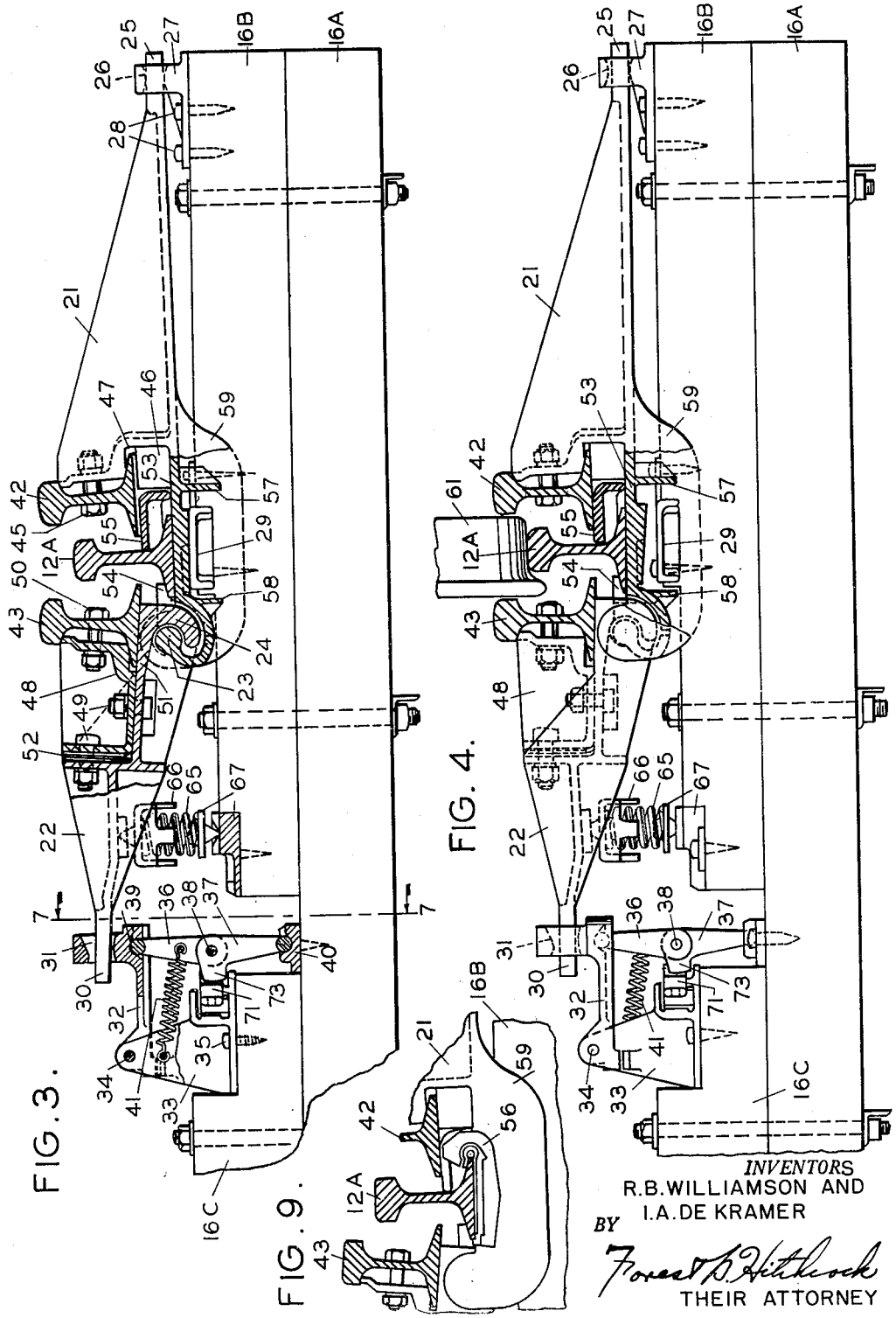

Jan. 5, 1965  R. B. WILLIAMSON ETAL  3,164,224
CAR RETARDER FOR RAILROADS
Original Filed Dec. 7, 1959  3 Sheets-Sheet 3
FIG. 5.
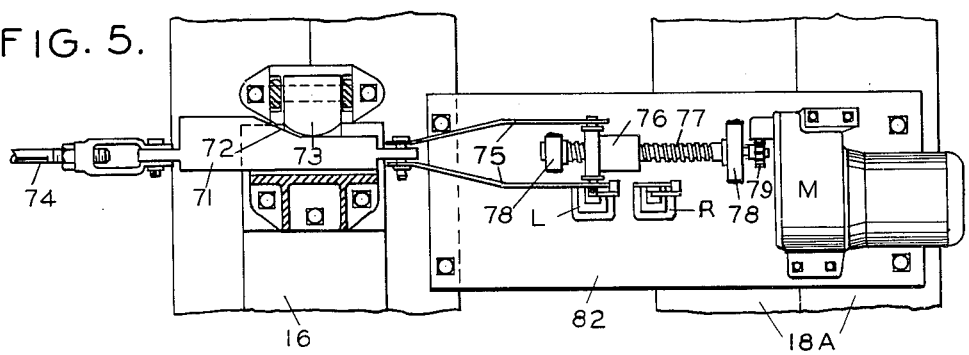
FIG. 6.
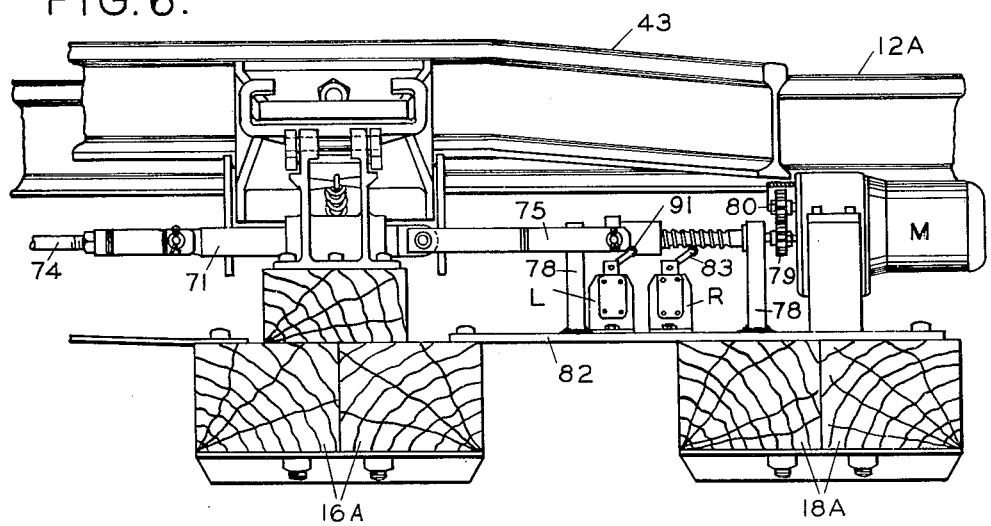
FIG. 7.  FIG. 8.
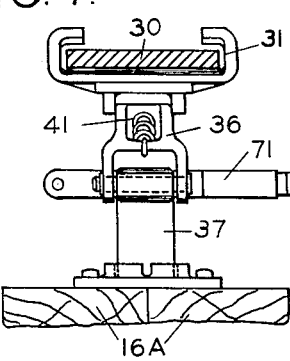
FIG. 10.
*INVENTORS*
R.B. WILLIAMSON AND
I.A. DE KRAMER
BY
*Forest B. Hitchcock*
THEIR ATTORNEY

United States Patent Office 3,164,224
Patented Jan. 5, 1965

3,164,224
CAR RETARDER FOR RAILROADS
Robert B. Williamson and Isaac A. De Kramer, Rochester, N.Y., assignors to General Signal Corporation, a corporation of New York
Continuation of application Ser. No. 857,941, Dec. 7, 1959. This application July 30, 1962, Ser. No. 215,239
2 Claims. (Cl. 188—62)

This invention relates to car retarders of the track brake type, and more particularly relates to car retarders of the inert type which utilize the weight of the car in the actuation of its mechanism; and to a means for releasing the car from the car retarder after it has been stopped and held therein.

The present invention provides improvement over the prior application of common ownership of H. S. Wynn Ser. No. 692,452, filed October 25, 1957, now abandoned, and no claim is made herein to subject matter disclosed in that application.

This application is a continuation of our prior pending application Ser. No. 857,941, filed December 7, 1959, now abandoned.

There are conditions in railway classification yards and the like where it is desirable to use a car retarder to stop and hold a car for an indefinite length of time and then release such car for further movement. One such condition where a car retarder of the inert type is desirable for use is at the end of a classification yard where the first car entering a specified track is stopped and held so that other cars may be stopped thereby until the desired number of cars are accumulated.

Track skates have been used for this purpose, such methods necessitating the services of attendants who are required to remove such track skates before the cars can be pulled out of the end of the yard by a locomotive, thus causing considerable expense and loss of time to train crews.

The present invention contemplates the use of an inert car retarder for stopping and holding the cars and a means for remotely controlling the car retarder from a closed or braking position to an open or nonbraking position so that the cars may be removed as desired by a locomotive which may be either manually or remotely controlled. Furthermore, means are provided for remotely controlling the car retarder back to a closed or braking position immediately after the cars have been removed therefrom so as to have it conditioned to stop and hold the next car to enter such specified classification track.

Generally speaking, the car retarder of the present invention is provided with brake shoes which are supported on a succession of articulated toggle lever beam units which rest on the tie bed with one brake shoe located on each side of the running rail which is also supported by the lever beam units. Each articulated toggle lever beam unit comprises two lever arms which are pivotally interlocked at their inner ends and bear on supporting brackets at their outer ends. The supporting bracket for the lever arm which is located on the outside of the running rail is fixed whereas the supporting bracket for the lever arm which is located on the inside of the running rail is spring biased. Each lever arm supports one brake shoe in a manner whereby they may cooperate with the car wheels passing therethrough on the running rail. The running rail is supported on the outer lever arm.

The spring biasing means consists of a coiled compression spring which is positioned under the outer end of the inner lever arm. This compression spring is of a size to normally balance the weight of the inner lever beam, thus lifting it to an upward position. This action causes it to pivot at the pivotally interlocked joint between the two lever beams and position the two brake shoes at their minimum distance of separation. In this normal position, the pivotally interlocked portion of the articulated lever beam unit is in a so called collapsed position and rests on the tie bed.

With the two brake shoes thus positioned with a minimum distance therebetween, the car retarder is positioned to receive average cars, the wheels of which have a width greater than the spacing between the brake shoes. Thus, as the first car wheel enters the car retarder, the brake shoes are separated, causing the articulated toggle lever beam units and the associated running rail to rise above its supporting tie bed. However, with the weight of the car now on the running rail, the rail and its associated lever beam units are forced downward towards the tie bed, causing the brake shoes to bear against both sides of the wheels. Thus, maximum braking is provided in accordance with the weight of the car to stop and hold the car or cars securely within the retarder.

The present invention also provides a means for releasing the braking pressure on the car wheels so that the cars may be removed as desired. Such release means comprises a motor operated multiple link and cam operating unit which trips spring biased toggle lever or link units associated with each articulated lever beam unit. When operated to a release position, the inner lever arms will drop at their outer ends, thus causing them to pivot counterclockwise at their toggle joints and open the spacing between the brake shoes. This action releases the braking pressure on the car wheels and permits the weight of the car to force the running rail and its associated lever beam units downward onto the tie bed again. The outer ends of the inner lever arms are also forced further downward against the bias of the compression spring so that the braking pressure on the car wheels is practically nil, thus permitting the cars to be removed by a locomotive. Resetting of the cam operating unit will again condition the car retarder for further braking duties.

As previously mentioned, the car retarder mechanism of the present invention is associated with only one of the running rails and the mounting is such that the toggle lever beam units are permitted to move transversely with respect to the direction of the rails and car travel. The other running rail is fastened securely to the tie bed as usually and is supplemented with a guard rail which is mounted parallel and adjacent thereto. Such a structure retains the wheel flanges of the car in line on the free rail and allows the wheels passing through the retarder brake shoes to position said brake shoes so that equal brake pressure is provided on both sides of the car wheels.

Other objects, purposes and characteristic features of the present invention will be partly apparent and partly pointed out as the detailed description progresses. In describing the invention in detail reference will be made to the accompanying drawings wherein the various parts will be referred to by distinctive reference characters and wherein:

FIG. 1 is a top plan view of a car retarder unit of the present invention showing the two end sections and only one intermediate section, the other intermediate sections being broken out due to limitations in drawing size;

FIG. 2 is a side elevation sectional view of part of the apparatus shown in FIG. 1 as taken on the line 2—2 of FIG. 1;

FIG. 3 is an end sectional view as taken on the line 3—3 of FIG. 1 and shows one of the articulated lever beam units of the car retarder of the present invention as well as the supporting means therefore, all in their normal position;

FIG. 4 is a view similar to FIG. 3 except that it shows the car retarder of the present invention in an operating position with a wheel of the car therein;

FIG. 5 is an enlarged top view of that portion of FIG. 1 showing the cam operating release apparatus for setting the car retarder of the present invention in a car releasing position;

FIG. 6 is a side elevation sectional view of the release apparatus shown in FIG. 5 as taken on the line 6—6 of FIG. 1;

FIG. 7 is an end sectional view of the toggle lever supporting means for the inner end of an articulated lever beam unit of the car retarder of the present invention as taken substantially on the line 7—7 of FIG. 3;

FIG. 8 is a partial view similar to FIG. 4 and shows the toggle lever supporting means portion thereof in its tripped position which releases the braking pressure against the car wheels;

FIG. 9 is an end sectional view showing the anchoring means for the running rail of the car retarder of the present invention, and;

FIG. 10 is a circuit arrangement for a typical manual control means for operating the car retarder of the present invention to a brake release position and for returning it to a braking position.

Referring now more particularly to FIGS. 1, 2 and 3 of the drawings, the car retarder of the present invention has been shown mounted in a special car retarder track section TS1 which is located between the two regular track sections TS2 and TS3. The regular track sections TS2 and TS3 comprise the usual rails 11 and 12 which rest on tie plates 13 and cross ties 14. The car retarder track section has a continuous rail 11A on one side which is a continuation of the regular rail 11 and rests on tie plates 15 mounted on special cross tie structures 16, 17 and 18. The other side of the car retarder track section has short sections of rail 12A which are mounted on the car retarder structure in a manner to form a continuous running rail as will be explained hereinafter. A guard rail 19 is mounted on the tie structures 16, 17 and 18 adjacent the rail 11A to act as a wheel flange guide as will also be explained hereinafter. The ends of the regular rails 12 and two end car retarder rail sections 12A and held in alignment and fastened to the ties 14 by means of special rail anchor brackets 20 and the usual bolts and lag screws.

The car retarder structure comprises a succession of articulated toggle lever beam units BU which are disposed laterally on the cross tie structures 16 and transversely with respect to the rail sections 12A. As shown more particularly in FIGS. 2 and 3, the cross tie structures 16 each comprise two fully extending ties 16A lying side by side and two short tie sections 16B and 16C, which are disposed end to end with a space therebetween. They rest on and are fastened to the two ties 16A. The cross tie structures 17 are located between the cross tie structures 16 and merely support the rail section 12A at their mid sections to prevent flexing thereof during a car movement therethrough when the car retarder is in an open position. Each of the cross tie structures 17 comprise two through ties 17A disposed side by side with a tie 17B resting thereon. The cross tie structures 18 support the center portion of rail sections 12A on either end of the car retarder section TS1 and each comprise two through ties 18A disposed side by side with a tie 18B resting thereon.

Each articulated toggle lever beam unit BU comprises two lever arms 21 and 22 which are pivotally joined together at their inner ends by means of a cylindrical bearing and socket connection. The cylindrical bearing portion 23 is an integral part of the lever arm 21 whereas the socket portion 24 is an integral part of the lever arm 22.

The outer end 25 of the lever arm 21 is of rectangular cross section and is slidably mounted in an opening 26 in a supporting bracket 27. The supporting bracket 27 is mounted on the tie 16B by means of lag screws 28. Thus, in its normal position, the inner end of the lever arm 21 which carries the cylindrical bearing portion 23 of pivotal joint will be supported by the tie 16B. A channel member 29 is interposed between the tie 16B and the lever arm 21 to provide a solid resting block.

The outer end 30 of the lever arm 22 is also of rectangular cross section and is slidably mounted in an opening 31 in a pivotally mounted lever arm 32. The pivoted end of this lever arm 32 is fastened to a supporting bracket 33 by means of a pin 34 and the supporting bracket 33 is mounted on the tie 16C by means of lag screws 35. The lever arm 32 is supported in its upright position by means of a spring biased toggle lever arrangement comprising two lever arms or toggle links 36 and 37 pivoted together by a toggle pin 38 at their inner ends. The outer end of the lever arm 36 bears in a socket 39 located on the underside of the free end of the lever arm 32 whereas the outer end of the lever arm 37 bears in a socket bearing 40 which is fastened to the tie 16A. A coil spring 41 fastened at one end to the supporting bracket 33 and at its other end to he lever arm 36 normally reains the spring biased toggle lever arrangement in an upright over center position relative to a center line extending between the support points 39 and 40 (see FIG. 3). Thus, the lever arm 32 and the outer end 30 of the car retarder lever arm 22 are normally rigidly supported.

Referring again to the car retarder lever beam units BU, each series of lever arms 21 and 22 is provided with a brake shoe which in this representation of the invention are shown as ordinary track rails 42 and 43 with their ends turned outward as shown at 44 to provide a tapered entrance for the car wheel as it enters therebetween. It should be understood, however, that other types of manufactured brake shoe beams could be used if desired. An advantage in using rails for brake shoes lies in the fact that standard commercial rails or even used rails may be utilized as the side of the rail head provides the braking surface.

In assembly, the brake shoe rail 42 is fastened to the inner end of the lever arm 21 by means of bolts and nuts 45. The end of the lever arm 21 is so shaped as to fit between the head and the foot of the brake shoe rail 42. The foot rests on a ledge 46 and extends into a groove 47 to provide a rigid support therefore. The other brake shoe rail 43 is adjustably mounted on the inner end of the other lever arm 22 in a manner whereby the spacing between the two parallel brake shoe rails 42 and 43 may be varied to compensate for wear. In this structure, a U shaped bracket 48 is fastened to the lever arm 22 by means of bolts and nuts 49 and the bracket 48 in turn is fastened to the brake shoe rail 43 by means of bolts and nuts 50. Both the bracket 48 and the brake shoe rail 43 rests on a flat ledge portion 51 of the lever arm 22 to provide a rigid support therefor. Shims 52 are placed in between the lever arm 22 and the bracket 48 as required to normally adjust the spacing between the brake shoe rails 42 and 43, and also permit readjustment as wear occurs.

The short rail sections 12A on which the car wheels travel extend from the center of one lever beam unit BU to another. Each rail section 12A has its end portions bearing on a flat ledge portion 53 of the lever arms 21 and is held in position against transverse movement by means of lugs 54 on the lever arm 21 and angle shaped wedges 55 which are driven into place between the web of the rail 12A and the side of the ledges 46. As shown in FIG. 9, lateral movement of the short rail sections 12A is prevented by means of rail anchors 56 which are fastened to the ends of each rail section 12A and bear against the sides of their respective lever beam units BU. These rail anchors 56 and their location with respect to the rail sections 12A and the lever beam units BU is shown in the broken away portion of FIG. 1.

From the detailed description given thus far, it can be seen and understood that the inert car retarder structure of the present invention permits the plurality of lever beam units BU to assume a normal so called collapsed position wherein the pivoted inner ends of the lever arms 21 and 22 rest directly on the channel members 29 of the tie bed structure and the outer ends of the lever arms 21 and 22 rest on their respective supporting brackets 27 and levers arms 32. As the outer ends of these lever arms 21 and 22 are slidably mounted in their respective supporting brackets 27 and lever arms 32, it can also be seen and understood that the complete car retarder unit is permitted a slight transverse movement in either direction with respect to the permanent running rail 11A. This movement is limited by the stop ribs 57 and 58 which are located on the bottom side of the lever arm 21 and positioned on either side of the channel member 29. Lateral movement of the lever beam units BU is prevented by means of the downwardly extending ribs 59 on the lever arms 21, these ribs 59 overlapping the ends of the channel members 29 and the sides of the ties 16B. The various tie structures 16, 17 and 18 are held in a properly spaced position by means of spacer bars 60 suitably fastened therebetween.

The transverse movement of the lever beam units BU is necessary due to the variation in the overall width of the car wheel trucks of the cars, such variation being caused by the width of the car wheels themselves. In operation, when a car wheel truck enters the car retarder, the regular rail 11A and its associated guard rail 19 will position the wheel and its flange located on one side of the wheel truck. The other wheel and flange of the wheel truck will enter between the brake shoes 42 and 43 and position the rail 12A and its associated lever beam units BU transversely in accordance with the overall width of the wheel truck.

Let us now assume that a moving car is about to enter the car retarder. The car, as represented by the car wheel 61 in FIG. 4, would spread the brake shoes 42 and 43 apart to accommodate the width of its wheels. This action would cause the complete lever beam units BU to pivot at their center sections and rise from the tie bed until the proper separation between the brake shoes 42 and 43 was attained, the outer ends of the levers 21 and 22 merely pulling inward on their slideable mountings 27 and 32.

As the first set of car wheels 61 moved on into the retarder between the brake shoes 42 and 43, the weight of the car on the rail sections 12A would begin to make its presence known and cause the rail sections 12A and their associated lever beam units BU to settle down towards the tie bed. However, this action would immediately cause the brake shoes 42 and 43 to close towards each other and apply braking pressure against the sides of the car wheels 61 with the lever beam units BU still suspended above the tie bed.

Ultimately, assuming that the spacing between the brake shoes 42 and 43 was properly set as previously described, the full weight on the car on the rail sections 12A would dictate the total amount of braking pressure applied against its wheels, and eventually stop the car within the car retarder. In the full brake and stopped position of the car, the lever beam units BU will still not be resting on the tie bed, hence the car will be held in its stopped position and act as a bumper stop for other cars which may traverse the same classification track and bump into it. The car or cars would thus remain in position held by the car retarder brake shoes 42 and 43 until such time as their release was desired.

It should also be understood that a cut of two or more cars may enter the car retarder as a unit and even though the first car may be light in weight and not provided enough self braking to stop the complete cut because of its momentum, the following car would also act on the car retarder to bring the whole cut to a complete stop.

The present invention also provides a means for releasing such cars as may be stopped and held in the car retarder. Generally speaking, the release means is accomplished merely by collapsing the toggle lever device 36–37 which supports the lever arm 32 in its upright position. This action permits both the lever arm 32 and the outer end of the car retarder lever arm 22 to move downward, such downward movement being caused by the weight of the car on the rail sections 12A, as will be explained more in detail hereinafter.

The present invention also provides a means for spring biasing the outer end of each car retarder lever arm 22 to its upward position even though its associated toggle lever device 36–37 be in its collapsed non-rigid supporting position. This device comprises a coiled compression spring 65 which is interposed between the bottom surface of the lever arm 22 and the tie bed tie 16B. A suitable housing cap 66 and a socket bearing block 67 hold the coil spring 65 in place. The bias of this spring 65 is such that it supports the weight of the car retarder lever arm 22 after the rigid toggle lever supporting device 36–37 has been collapsed. Such a device also helps to lessen the force required to reset the toggle lever device 36–37 after it has once been collapsed.

Referring now to the means for tripping the toggle lever devices 36–37 described above, and more particularly to FIGS. 1 and 5 to 8 inclusive of the drawings, the supporting brackets 33 for each of the toggle lever devices 36–37 are each provided with a grooved portion 70 which houses a cam block 71 slidably mounted therein. The cam block 71 is provided with a beveled surface 72 on one side thereof for cooperation with a rounded cam follower lug 73 located on the lower lever arm 37 in a position adjacent the pivot pin 38. The various cam blocks 71 are attached together by means of link bars 74. The end links bar 75 is pivotally connected to a screw block 76 which is suitably mounted to prevent its turning. This block 76 is provided threads to receive a threaded shaft 77 which is rotatably mounted in bearing blocks 78. A gear wheel 79 is mounted on the shaft 77 and cooperates with a gear wheel 80 and a gear train operatively connected to the shaft of a reversible motor M.

Thus, operation of the motor M in one direction will cause movement of the block 76 along the threaded shaft 77 and cause a movement of the link bars and their associated cam blocks 71 in a direction to trip the toggle lever device 36–37 as shown in FIG. 8. Operation of the motor M in the other direction would restore the toggle lever device 36–37 to its normal position as shown in FIG. 4.

More specifically, when it is desired to release the car or cars from the car retarder, such retarder would be in a position as shown in FIG. 4 with the track brakes applied and its lever beam units BU in their raised positions above the tie beds. Operation of the motor M would now operate the cam blocks 71 to the right, causing the beveled cam surface 72 (see FIG. 5) to cooperate with the cam follower lug 73 and force the lever arm 37, the pivot pin 38 and the lever arm 36 to the right beyond center as shown in FIG. 8, thus collapsing the rigid support for the lever arm 32 and its associated car retarder lever arm 22.

With no rigid support now under the outer end of the lever arm 22, the weight of the car 61 on the rail section 12A would cause rail 12A and the car retarder lever arm 21 to move downward onto the tie beds 16, thus forcing the brake shoe 43 outward. This action would cause the lever arm 22 to pivot counter clockwise and force its outer end downward against the bias of the coil spring 65, and cause further collapse of the toggle lever device 36–37 against the bias of its spring 41. At this point of operation, it can now be seen that the brake shoe pressure against the sides of the car wheels is released with the possible exception of the biasing pressure of the two springs 41 and 65, which pressure is practically nil so far as wheel brakes are concerned.

The car or cars may now be removed from the car retarder track section TS1 by a locomotive or other means. In some instances it has been found necessary to run a locomotive or other car through a car retarder section. As locomotives and other special cars sometimes have wider wheels than ordinary cars they would naturally spread the brake shoes 42 and 43 further apart. However, this would cause no damage to the car retarder or its release mechanism as the toggle lever device 36–37 may be forced to an extreme collapsed position as shown by the dotted position 81 illustrated in FIG. 8. Also, the car retarder lever arm 2 may pivot downward and compress the spring 65 the necessary distance to permit the wider locomotive wheels to pass between the brake shoes 42 and 43.

When the car removal operations have been completed, the car retarder may be restored to its normal position as shown in FIG. 3, merely by reversing the motor M which will cause the cam blocks 71 to move to the left, thus removing the cam surface 72 away from the cam follower lug 73 and permitting the biasing spring 41 to restore the toggle lever device 36–37 to a rigid upright position. The coil spring 65 will restore the car retarder lever arm 22 and its associated brake shoe 43 to its normal upward position as soon as the car or cars are removed from the car retarder track section TS1.

The control of the motor M for operating the car releasing mechanism is preferably controlled through limit switches L and R which may be located on a special tie plate 82 along with the motor M as shown in FIG. 5 and 6. These limit switches L and R are provided with trip arms 83 and 91 which are operated by movement of the link arm 75 as previously described. In actual practice, the double winding reversible motor M may be manually controlled either locally or from the control tower, or may be controlled by track circuits through track treadles operated by the wheels of a locomotive as it is about to enter the car retarder track section TS1.

In FIG. 10 of the drawings there has been illustrated a simple control circuit which, by way of example, is shown controlled by a manually operated switch CS. With the control switch CS in its right-hand position as shown, the winding 84 of the motor M is energized through a circuit which may be traced from the positive (+) side of a current source through the contact 85, wire 86, contact 87 of the limit switch R, wire 88, winding 84 and wire 89 to the negative (−) side of the current source.

With the winding 84 of the motor M thus energized, the releasing mechanism will operate the cam block 71 to the right and trip the toggle lever device 36–37 as previously described. Also, the winding 84 will be deenergized when the movement is completed by reason of a broken circuit at the contact 87 of the limit switch R. During the movement just described, the contact 90 of the limit switch L was made up so that the releasing mechanism may next be returned to its normal position merely by reversing the control switch CS to its left-hand position to energize the winding 92 of the motor M.

This circuit may be traced from the positive (+) side of the current source through the contact 85 in its dotted position, wire 93, contact 90 of the limit switch L, wire 94, winding 92 and wire 95 to the negative (−) side of the current source. When the reversing movement of the releasing mechanism has been completed, the contact 90 of the limit switch L will again be broken causing deenergization of the winding 92 and the contact 87 of the limit switch R will again be made to condition the releasing mechanism for its next release movement.

As shown and described in the drawings and specification, the present invention provides a car retarder of the inert type which, when placed near the end of a track in a railroad classification yard, will stop and hold a car or cars automatically until such a time as it is desired to release such cars. As the car retarder is weight automatic in operation, no power is required and the weight of the car itself dictates the amount of brake pressure applied thereto. Also, the car retarder is sectional in structure so that it may be made up in any desirable length as desired in accordance with the normal speed of the cars entering thereinto.

There is also provided a means for automatically releasing a car or cars stopped in the car retarder at any desired time so that they may be removed therefrom without the manual help of attendants and loss of locomotive crew time such as is necessary with track skates. Such release means is also automatically restored after removal of the cars so as to condition the retarder for further use in stopping and holding additional cars.

Having shown and described one particular form which the present invention can assume, it is desired to be understood that various other forms, adaptations, alterations and modifications may be applied to the specific form shown to meet the requirements of practice except as limited by the scope of the following claims.

What we claim is:

1. A car retarder associated with a track rail in a stretch of railway track comprising:
    (a) brake beams disposed on both sides of the track rail for engagement with car wheels,
    (b) a plurality of pairs of opposing levers laterally spaced and disposed longitudinally on top of respective railway ties of said stretch rail for operating the brake beams and supporting the track rail,
    (c) one of the opposing levers of each pair extending beneath the track rail and having an integral hook formed upwardly in one end and having its other end bearing on a support point on the top of the associated railway tie,
    (d) the other of said levers of each pair having an integral hook formed downwardly in one end and having its other end bearing on a support point on the top of the associated railway tie, and
    (e) means for connecting the brake beams to the levers, the beam on the inside of the track rail being connected to one lever of each pair, and the beam on the outside of the track rail being connected to the other lever of each pair,
    (f) said hooked ends of the levers of each pair being connected together in a manner to permit articulation of the hooked ends of the levers elevationally whereby the track rail is supported by the levers at a point between the bearing points of the levers on their respective support points and the spreading of the brake beams by the passage of a car wheel raises the track rail elevationally to permit application of baking pressure to a car wheel in proportion to the pressure exerted by a car on the track rail.

2. A car retarder associated with a track rail in a stretch of railway track comprising:
    (a) brake beams disposed on both sides of the track rail for engagement with car wheels,
    (b) a plurality of pairs of opposing levers laterally spaced and disposed longitudinally on top of respective railway ties of said stretch for operating the brake beams and supporting the track rail,
    (c) said levers of each pair being pivotally connected end to end and being suported at their outer ends, (d) means for connecting the brake beams to the levers, the beam on the inside of the track rail being connected to one of the levers of each pair and the beam on the outside of the track rail being connected to the other lever of each pair,
(e) a channel shaped pad for each of the ties extending longitudinally beneath the track rail and secured on top of the associated tie with at least one end protruding from one side of the tie, and
(f) one of said levers of each pair extending beneath the track rail and having formed in its lower surface transverse abutments cooperating with the longitudinal sides respectively of the associated channel shaped pad and having longitudinal abutment extending downwardly along both sides of the associated tie.

References Cited in the file of this patent

UNITED STATES PATENTS

| | | |
|---|---|---|
| 1,627,137 | Barr | May 3, 1927 |
| 2,285,327 | Brown | June 2, 1942 |
| 2,345,488 | Logan | Mar. 28, 1944 |
| 2,815,097 | Marsh | Dec. 3, 1957 |
| 2,858,907 | Brown | Nov. 4, 1958 |

FOREIGN PATENTS

| | | |
|---|---|---|
| 266,715 | Great Britain | May 26, 1927 |